United States Patent [19]
Ward

[11] Patent Number: 5,277,829
[45] Date of Patent: Jan. 11, 1994

[54] DEEP BED SAND FILTER
[75] Inventor: Stephen D. Ward, Lewisburg, Pa.
[73] Assignee: Andritz Sprout-Bauer, Inc., Muncy, Pa.
[21] Appl. No.: 913,290
[22] Filed: Jul. 14, 1992
[51] Int. Cl.⁵ .......................................... B01D 24/46
[52] U.S. Cl. .................................. 210/792; 210/805; 210/807; 210/189; 210/196; 210/268; 210/269; 210/274
[58] Field of Search .............. 210/792, 797, 805, 807, 210/194, 196, 269, 274, 268, 189

[56] References Cited

U.S. PATENT DOCUMENTS

| | | | |
|---|---|---|---|
| 2,057,887 | 10/1936 | Elliott et al. | 210/141 |
| 2,715,964 | 9/1955 | Martin | 210/128 |
| 3,395,099 | 7/1968 | Johnson | 210/35 |
| 3,512,640 | 5/1970 | Hellmann | 210/80 |
| 3,537,582 | 11/1970 | Demeter | 210/189 |
| 3,563,385 | 2/1971 | Bykov | 210/268 |
| 3,581,895 | 6/1971 | Howard | 210/108 |
| 3,598,235 | 8/1971 | Demeter | 210/189 |
| 3,667,604 | 6/1972 | LaGoutte | 210/136 |
| 3,707,230 | 12/1972 | Davidson | 210/384 |
| 3,767,048 | 10/1973 | Prengemann | 210/189 |
| 3,841,485 | 10/1974 | Malkin | 210/104 |
| 4,005,016 | 1/1977 | Haese et al. | 210/268 |
| 4,036,757 | 7/1977 | Peasley | 210/196 |
| 4,060,484 | 11/1977 | Austin et al. | 210/189 |
| 4,126,546 | 11/1978 | Hjelmner et al. | 210/19 |
| 4,197,201 | 4/1980 | Hjelmner et al. | 210/268 |
| 4,246,102 | 1/1981 | Hjelmner et al. | 210/704 |
| 4,257,896 | 3/1981 | Ikeda et al. | 210/268 |
| 4,265,767 | 5/1981 | Gappa et al. | 210/662 |
| 4,720,347 | 1/1988 | Berne | 210/792 |
| 4,861,472 | 8/1989 | Weis | 210/189 |
| 4,891,142 | 1/1990 | Hering, Jr. | 210/792 |
| 5,019,278 | 5/1991 | Jacquet | 210/792 |
| 5,112,504 | 5/1992 | Johnson | 210/792 |

FOREIGN PATENT DOCUMENTS

| | | |
|---|---|---|
| 2623794 | 12/1987 | France . |
| 2626868 | 2/1988 | France . |
| 0306431B1 | 8/1988 | France . |

OTHER PUBLICATIONS

Allanson et al., Development of a Continuous Inclined Sand Bed Filter, Paper Presented at Filtration Society's Conference on Liquid Solid Separation, London, Sep. 16-19, 1975.

Libby et al. Chemical-Physical Treatment of Municipal Wastewater Using Continuous Countercurrent Filtration, Journal Water Pollution Control Federation, vol. 44, No. 4, Apr. 1972, pp. 574-582.

The John-Mansville Moving Bed Filter System for Treatment of Sewage, Johns-Mansville Environmental Control Systems Technical Bulletin No. MBF-1.

*Primary Examiner*—Ivars Cintins
*Attorney, Agent, or Firm*—Chilton, Alix & Van Kirk

[57] ABSTRACT

A deep bed upflow filter (10) for removing suspended solids from an influent stream to provide a clean filtrate, comprising an upright vessel (12) having a vertical axis (14), top and bottom ends (16,18) and contiguous upper (20), lower (22), and intermediate (24) regions between the ends. The upper region contains filtrate (26) up to a first elevation (28) and an outlet (30) for drawing the filtrate out of the vessel. The intermediate region contains particulate filter media (32) for removing the suspended solids from influent moving upwardly through the media as the media, dirtied with solids, moves downwardly into the lower region. The lower region is generally tapered (36) inwardly toward the vessel bottom and contains dirty media (34) that has moved downwardly from the intermediate region. Influent is introduced (44) between the intermediate and lower regions, and the dirty media is collected (46) at the bottom and transported (50) to a regenerative washing compartment (52). A portion of the reject flow (64) from the wash compartment is delivered (72,74) to the dirty media in the lower region of the vessel and another portion (72,78) is delivered to the area (46,48,50) where the dirty media is collected and transported. This latter portion is preferably introduced into a collection conduit (46) through a pipe (130) having a concentric inner tube (140) by which air is injected to fluidize and move the mixture of air, dirty media, and reject water in the conduit (46) toward an airlift (48,148).

25 Claims, 3 Drawing Sheets

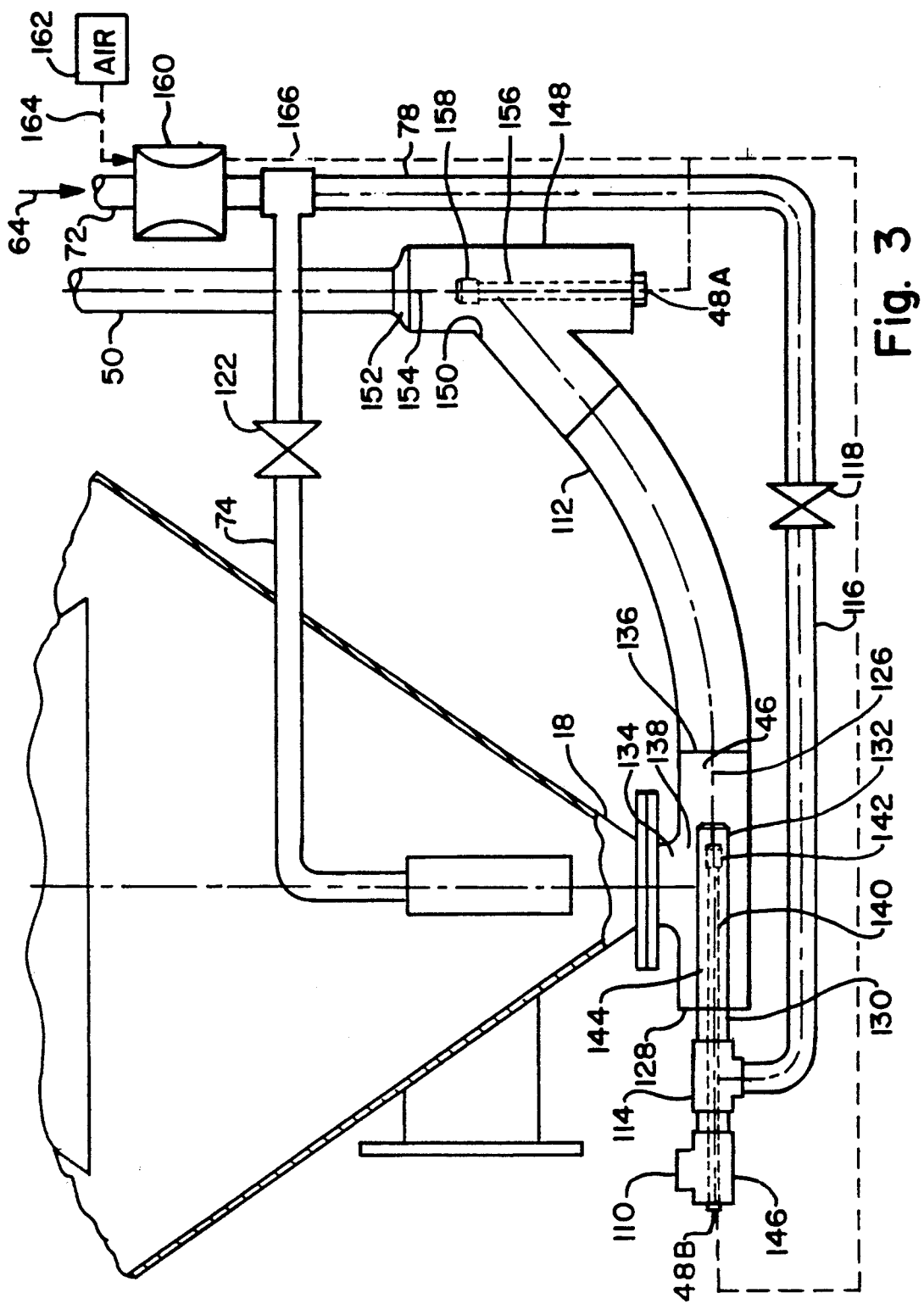

DEEP BED SAND FILTER

BACKGROUND OF THE INVENTION

The present invention relates to deep bed sand filters, and more particularly, to an upflow type of deep bed sand filter.

For many years, deep beds of sand, or other fine particulates, have been utilized for filtering relatively large quantities of liquid, for example, the secondary treatment of industrial waste water or the like. In the most primitive deep bed sand filters, the filtered solids which have been "trapped" among the sand particulates, can be removed from the filter only by throwing away the "dirty" sand.

In more advanced filters, the filter media has been conserved by a variety of techniques most-of which draw the dirty sand from the bottom of the filter vessel and pass the dirty sand through a media washing chamber situated either externally or internally of the vessel.

In one type of regenerative filter, the influent is introduced in the upper portion of the filter vessel above the sand bed, and the flow of both liquid and sand is in a downward direction in the vessel. This is represented by the filters described in U.S. Pat. No. 4,060,484 issued Nov. 29, 1977, and U.S. Pat. No. 4,891,142 issued Jan. 2, 1990.

Another approach, represented by U.S. Pat. No. 4,126,546 issued Nov. 21, 1978, and U.S. Pat. No. 4,246,102 issued Jan. 20, 1981 introduces the influent at an intermediate elevation within the sand bed, such that the fluid flows upwardly in the vessel, while the sand moves downwardly.

The patents mentioned above, as well as others such as U.S. Pat. No. 5,019,278 issued May 28, 1991, disclose a variety of said washing techniques, some of which use a portion of the filtrate as the washing medium. It can readily be appreciated that the use of filtrate in this manner, reduces the amount of filtrate that can be drawn from the filter vessel as "clean" water for subsequent, higher value use. In other words, known regenerative deep bed sand filters of the type that use filtrate as the wash medium, have an excessive percentage of the filtrate "wasted" in the reject flow.

SUMMARY OF THE INVENTION

It is an object of the present invention to provide an upflow type, regenerative deep bed sand filter in which the percentage of filtrate required as the wash medium for the recycled sand is reduced relative to that of conventional techniques.

It is a further object of the invention, to provide an upflow type, regenerative deep bed sand filter which is relatively simple, compact, rugged, and durable, yet provides external excessibility to those components that are likely to experience significant wear.

These and other objects are accomplished by utilizing filtrate as the washing medium in a sand washing chamber, but drawing a portion, preferably about one-third, of the reject flow from the washing chamber outlet, for mixing with the flow of dirty sand upstream of the washing chamber. More particularly, some of the reject flow is introduced into the bottom of the filter vessel to mix with the dirty sand, immediately before it is transported to the wash chamber. Another portion of the reject flow is mixed with the dirty sand in the transport pipe by which the dirty sand is transported from the bottom of the vessel to the washing chamber. Preferably, the wash chamber is within the upper region of the vessel and the transport pipe is external to the vessel. Transport of the dirty sand is preferably accomplished by air lift, i.e., by injecting air into the transport pipe as it rises vertically along the exterior of the vessel.

The introduction of the reject fluid in the vicinity of the vessel outlet to mix with the dirty sand, produces a wet slurry which is readily fluidized by the injected air. This not only facilitates transport per se, but the consistency of the slurry promotes significant turbulence during transport, which helps separate the dirty solids from the filter media even before the dirty sand is discharged into the wash chamber.

By using the portion of the reject flow in this manner, a much higher concentration of dirt in the reject flow is produced. The filter in accordance with the present invention can have equal if not better throughput for a given volume of filter media, with the advantage of a one-third reduction in reject flow.

In a further feature of the present invention, the wash chamber is situated in the upper region of the vessel, immersed in, but fluidly separated from, the accumulated filtrate. The wash chamber discharges clean sand into a substantially tubular distribution member having upper and lower ends supported coaxially in the vessel such that the lower end is in contact with the filter bed and the upper end receives the cleaned filter media. The tubular distribution member not only distributes the sand evenly over the filter bed, but it also entraps any dirt particles that may inadvertently drop from the wash chamber toward the filter bed instead of being transported out in the reject flow. This significantly reduces the possibility of filtered solids finding their way into the filtrate that is drawn out of the vessel as clean water.

In one implementation of the present invention, an upright vessel has an upper region containing filtrate up to a first elevation and means for drawing the filtrate out of the vessel. An intermediate region contains a bed of particulate filter media for removing the suspended solids from influent moving upwardly through the media as the media, dirtied with the solids, moves downwardly into the lower region. The lower region is generally tapered inwardly toward the vessel outlet at the bottom and contains dirty media that has moved downwardly from the intermediate region. Influent feed lines introduce influent between the intermediate and lower regions with sufficient pressure to cause the upward flow of influent through the intermediate region. Transport means are provided for drawing dirty media out of the lower region at the bottom of the vessel and transporting the dirty media externally of the vessel to the top of the vessel. Wash means situated in the upper region receive the flow of dirty media and remove the solids, and deposit cleaned media into the intermediate region. The wash means include a compartment that is generally isolated from the filtrate in the upper region except for a compartment inlet at a second elevation below the first elevation. The compartment further includes an outlet from the vessel at a third elevation above the second elevation but not above the first elevation. A wash path is defined between the compartment inlet and outlet, for flowing a portion of the filtrate from the compartment inlet to the outlet while the dirty media flows through the compartment toward the compartment inlet, whereby solids are carried by the filtrate portion along the wash path and out of the vessel as a flow of reject. A pipe subsystem is fluidly connected to the reject flow, for delivering a first portion of the reject flow to the dirty media in the lower region, and for delivering a second portion of the reject flow to the transport means for drawing and conveying dirty media out of the lower region.

BRIEF DESCRIPTION OF THE DRAWINGS

The preferred embodiment of the invention will be described below with reference to the accompanying drawings, wherein like numerals represent like structures, and wherein:

FIG. 3 is an elevation view of the preferred arrangement for air lifting the dirty media to the wash compartment.

DESCRIPTION OF PREFERRED EMBODIMENT

Figure 1:
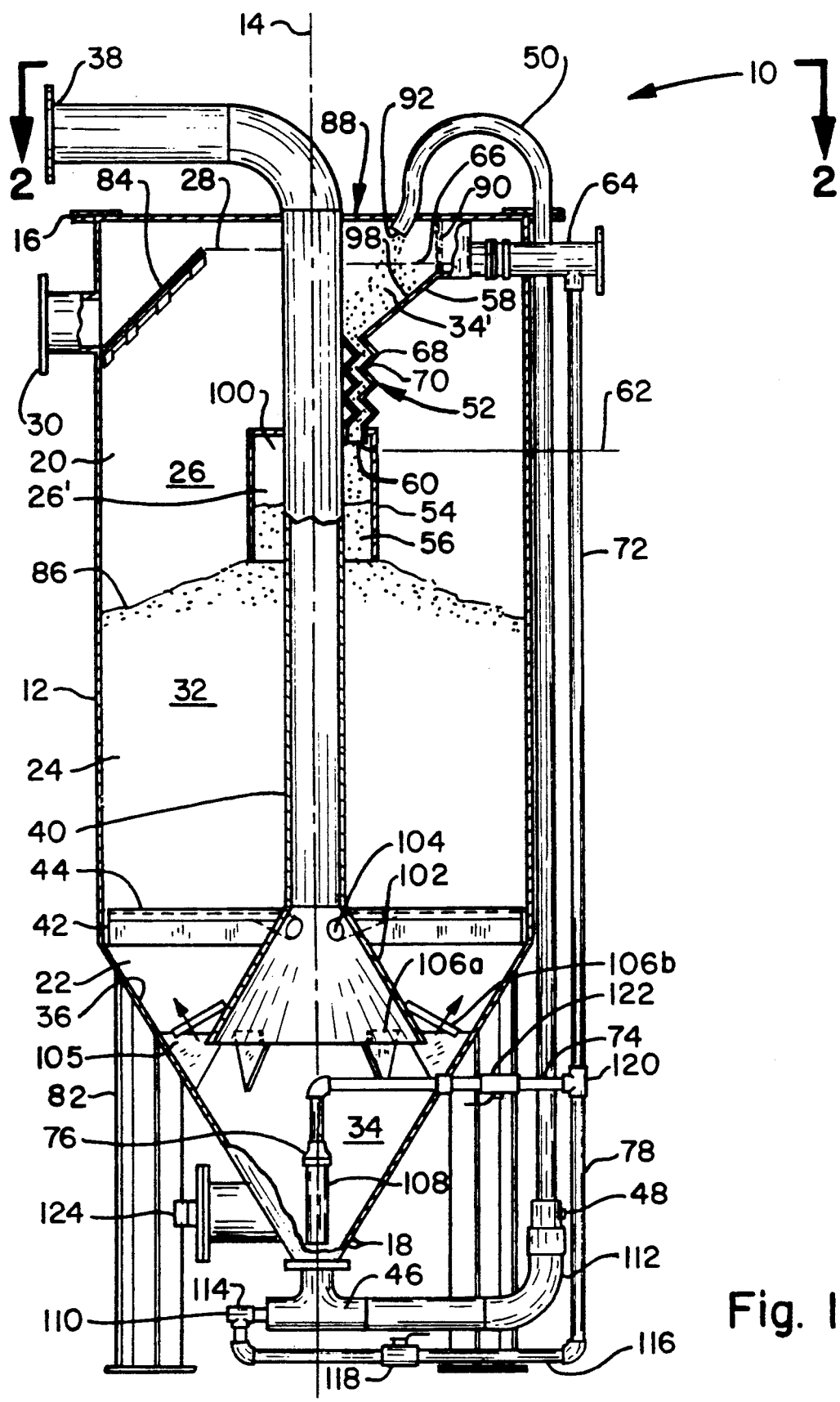
FIG. 1 is an elevation view, in section, of an upflow, regenerative, deep bed sand filter in accordance with the invention.
Figure 2:
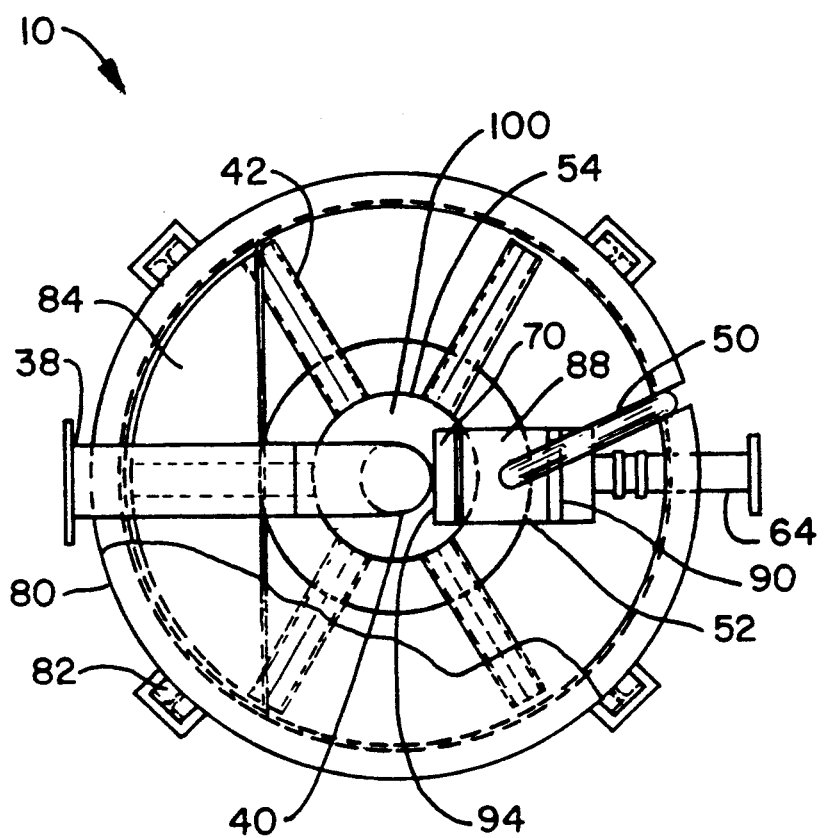
FIG. 2 is a section view taken along line 2—2 of FIG. 1.

FIGS. 1 and 2 show a deep bed upflow filter 10 for removing suspended solids from an influent stream to provide a clean filtrate. The filter comprises an upright vessel 12 having a vertical axis 14, top and bottom ends 16,18, and upper 20, lower 22, and intermediate 24 regions between the ends. During operation, the upper region 20 contains clean filtrate, up to a first elevation 28, where flow over a weir 84 leads to a nozzle or other means 30 for drawing the filtrate out of the vessel. The angled weir 84 is situated at one side of the vessel, with the upper portion thereof defining the first elevation 28 of the filtrate. The intermediate region 24 contains a bed of particulate filter media 32, preferably sand, for removing suspended solids from the influent, which moves upwardly through the media, as the media, dirtied with the solids, moves downwardly into the lower region 22.

The influent stream is preferably introduced through a feed nozzle 38 situated above the top 16 of the vessel and extending radially inward to the vertical axis 14, where the feed tube 40 extends coaxially through the upper and intermediate regions 20,24, to the approximate elevation where the vessel tapers inwardly as shown at 36. At this elevation, a plurality of feed nozzles in the form of substantially radially extending hooded feed conduits 42, have open bottoms and peaked tops 44. The influent stream is discharged through the open bottoms of the members 42, but because the pressure at the bottom 18 is so high relative to the pressure at the top 16 of the vessel, the flow direction is upward through the filter bed 32 in the intermediate region 24.

It should be appreciated that the filter bed 32 spans the lower and intermediate regions 22,24, and that it is unnecessary to define precisely a dividing line between the regions. In general, however, the lower limit of the intermediate region 24 may be defined as the elevation at which influent under pressure is introduced to the sand bed.

The filter media 32 with entrapped solids moves downwardly past the feed conduits 42 into the lower region 22 where the dirty media is eventually drawn out of the bottom 18 of the vessel, preferably into a rounded box, or generally horizontally oriented collection conduit 46. The dirty media in conduit 46 is subjected to flow forces, preferably by means of air injected at 48 into a vertically oriented transport tube 50 connected to conduit 46 outside the vessel 12. The transport tube 50 discharges into wash unit 52 situated in the upper region 20, for receiving a flow of dirty media, removing the solids from the dirty media, and depositing clean media 56 into the intermediate region 24. The wash unit 52 includes a wash compartment 58 and a media distribution member 54. The wash compartment 58 is generally isolated from the filtrate 26 in the upper region 20, except for a compartment inlet 60 at a second elevation 62 below the first elevation 28. The compartment 58 further includes an outlet 64 from the vessel 12, at a third elevation 66 above the second elevation 62 but not above the first elevation 28. A baffled portion 68 of wash compartment 58 defines a wash path 70 between the compartment inlet 60 and the outlet 64, for flowing some of the filtrate 26' from the compartment inlet 60 to the outlet 64 while the dirty media 34' flows through the compartment 58 toward the compartment inlet 60. The solids are carried by the filtrate 26' along the wash path defined in part as baffled plates 68,70 and out of the vessel as a flow of reject through outlet 64, and the clean media falls into the distribution member 54.

In accordance with a particularly noteworthy feature of the present invention, first pipe subsystem 72,74,76 is fluidly connected to the reject flow outlet 64, for delivering a first portion of the reject flow to the dirty media 34' in the lower region 22, whereby the dirtied sand experiences a reduction in consistency that facilitates collection and transport through the flow path defined by the collection conduit 46 and the vertical transport tube 50.

More generally, the return of a portion of the reject flow to the vicinity of the vessel outlet 18 in order to facilitate transport of the dirty sand to the wash unit 52, can be accomplished in one or both of two ways. In the first, the pipe 74 partitions some of the withdrawn reject flow from pipe 72, for discharge through nozzle 76 the lower region 22 of the vessel, substantially at the lower end 18, where the dirty media is wetted just prior to withdrawal from the vessel. The remaining reject portion in pipe 72, is delivered via pipes 78 and 116, to a location 114 outside the vessel, upstream from where the dirty media is received by the collection conduit 46.

The upper and intermediate regions 20,24 are preferably contained within a substantially cylindrical vessel wall portion indicated generally at 80, from which the vessel wall tapers inwardly at 36 to define lower region 22. Vertical struts or columns 82 are attached to footings or the like (not shown) for supporting the vessel in its upright position above the floor, whereby the conduits and pipes such as 46 and 116 may extend horizontally beneath the vessel before turning upwardly into conduits 50,72, respectively.

Additional, preferred details of the filter 10 in accordance with the present invention, particularly the wash compartment 52 and distribution member 54, will now be described.

The upper surface 86 of the sand bed 32 forms a slight angle of repose and, in general, defines the boundary between the upper region 20 and the intermediate region 24. It should be appreciated, however, that the open lower end of the tubular distribution member 54 is in contact with the upper surface 86 of the sand bed. The cleaned sand 56 which is deposited in the annulus 100 between the feed conduit 40 and the tubular walls of the distribution member 54, accumulates as a ring at the apex of the sand bed, within the distribution member 54.

The angle of repose of the filter bed surface 86 arises naturally as the sand within the distribution member 54 flows downwardly as sand is withdrawn through the bottom 18 of the vessel. Filtrate 26' occupies the upper portion of the annular space 100 within the distribution member 54 and provides the source of wash media at inlet 60 of the washing compartment 58. The distribution member is closed at the top and open at the bottom. Filtrate 26' originates from the upward flow through the sand bed 32 along the exterior of conduit 40 into and through the ring of sand 56.

Because elevation 28 is above elevation 60, as well as elevation 66, a hydraulic flow path is established upwardly through the baffle plates 68. The wash compartment 58 preferably includes an upper portion or chamber 88 that extends generally radially, vertically spans the first and third elevations 28,66 and is situated to receive the dirty media 34' from transport tube 50. A lower portion of the compartment 58 is formed by the baffle wall means 68 adjacent the vessel axis, i.e., in close proximity 94 to the vertical inlet flow conduit 40. The baffling induces cascading action of the filter media in alternating direction against the baffle walls, in counterflow relation to the upwardly flowing filtrate 26' that enters at 60 and flows upwardly toward the reject outlet 64.

The upper chamber 88 preferably includes a oblique portion 98 extending from the upper end of the baffle walls 68 to another weir 90 which defines the third elevation 66. The discharge end 92 of the transport pipe 50 is preferably situated substantially above the center of the rectangular outline defined by chamber 88. It can be appreciated that the wash unit 52 is isolated from the filtrate 26, except at the inlet 60 of the baffled flow path 70.

Another detail of the preferred implementation of the present invention is associated with the manner in which the influent is distributed or introduced into the sand bed 32. An inverted, funnel-shaped hood or cone 102 flares outwardly from the bottom of feed conduit 40, generally at the transition in the vessel shape from cylindrical to tapered. The hood 102 has a plurality of apertures 104, preferably six to ten, from which a like number of the distribution spokes 42 extend radially outward substantially symmetrically about the axis 14. In the preferred arrangement, the upper, radially extending portion of the inlet conduit 40 is diametrically opposed to the radially extending centerline of the wash chamber 88 and reject flow tube 64. The weir 84 is situated under the horizontal portion of inlet feed conduit. When viewed from above, the weir 84 has a perimeter resembling that of a lemon wedge.

The combination of the cone 102 and inwardly tapered portion 36 of the vessel 12, defines a rapid reduction in cross sectional flow area in the lower region 22, i.e., a restricted flow annulus at 105. Substantially at the flow annulus 105, a plurality of flat plate members 106b and intersecting angle bars 106a can be provided between the hood 102 and wall 36 to support the influent assembly 40, 42, 102, particularly during shipping of the unit. Preferably, the first portion of the reject flow is introduced into the lower region 22 via the pipe 74, nozzle 76, and screen 108, below the restricted annulus 105.

For start-up purposes, a supply of fresh or dirty water 110 at higher pressure should be available for introduction through fitting 114 into the collection conduit 46, upstream of the location where the dirty sand is withdrawn from the vessel bottom 18. This is also substantially at the point where the second portion of the reject flow is introduced via pipes 78 and 116, into the collection conduit 46. One or more short bursts of high pressure water starts the movement of sand. After sand movement starts, water injection at 110 is stopped.

Typically, the collection conduit 46 is an inverted "T", fitted to a long radius transition elbow 112 having the air injection fitting for receiving the flow of air at 48. The cross section of conduits 46 and 112 is significantly larger than that of the transport pipe 50, because the fluidization and increased pressure at 48 causes a higher velocity flow in conduit 50. This relatively high turbulence helps separate the solids from the filter media even prior to discharge at 92 into the wash unit 52.

It should be appreciated that, optionally, pipes 74 and 116 may be provided externally of the vessel, with flow adjustment means such as the valves 118,122. It should also be appreciated that preferably one-third of the reject flow in conduit 64 is diverted via pipe 72 which, via coupling 120, is further divided between pipes 74 and 78.

It should be appreciated that the pressure in the lower region 22 immediately above the annulus 105 is quite high and contributes to the directing of the inlet flow upwardly when introduced at spokes 42. On the other hand, below the annulus 105, the pressure is rather modest, such that the flow via 72,74,76,118 relies primarily on gravity head in pipe 72. Similarly, the air injection at 48, induces a natural flow through pipe 116 into coupling 114, which is at a lower pressure than the injection pressure 48.

Other features of the preferred embodiment are provided to facilitate maintenance of the unit. This can include a drain port 124 which is provided at the lower end 18 of vessel 12. The component of the overall filter unit 10 which is subject to wear, the air injection unit at 48, is preferably provided externally of the vessel. The wash and distribution means 52 is situated substantially within the upper, or filtrate region, 26, and therefore does not unduly extend the vertical dimension of the filter 10. Only two small diameter pipes 50,72 are situated externally of the circumference of the vessel wall 80. This permits a relatively close packing of adjacent filter units 10.

FIG. 3 shows the preferred arrangement for air lifting the dirty media to the wash compartment. The collection conduit 46 is situated immediately below the bottom 18 of the vessel, and is generally horizontally elongated with a central axis 126. One end 128 of the conduit 46 is closed, except for a first pipe 130 which penetrates coaxially and has a discharge end 132 situated between the inlet 134 of the conduit, and the outlet 136. Preferably, the conduit 46 is substantially tubular, with an inner diameter that is larger than the outer diameter of pipe 130, thereby defining an annulus 138 through which the dirty media drawn out of the vessel bottom 18 at the inlet 134, is directed out of the conduit 46 through outlet 136, in a generally axial direction.

It should be understood that the liquid flow through line 116 consists of a portion of the reject flow from 64 (see FIG. 1), that enters pipe 130 through fitting 114. A second pipe, or tube, 140 is coaxially situated within the first pipe 130, and extends through fitting 114 and fitting 146. At fitting 146, the tube 140 receives a supply of high pressure air at 48b. Within and adjacent to the discharge end 132 of pipe 130, tube 140 has a diffuser 142. The outer diameter of tube 140 is less than the inner diameter of pipe 130, so as to define a flow annulus 144 through which the reject flow from line 116 can be mixed with the high pressure air at the diffuser 142, and directed at high velocity parallel to the axis 126 of the collection conduit 46. The flow annulus 144 is also in fluid communication with the auxiliary source of water 110 at coupling 146.

A curved transition conduit 112, preferably having the same inner diameter as the outlet 136, receives the mixture of dirty media, reject flow, and air discharged from the outlet 136, and gradually directs this flow upwardly to the air lift shown generally at 148. The air lift preferably includes a vertically oriented housing coaxially aligned with the transport pipe 50, and connected thereto by means of a reduction collar or neck 152. An air injection tube 156 is centered on the axis 154 of housing 148, and has a discharge nozzle 158 preferably situated between the inlet 150 of the transition conduit 112 to the housing 148, and the reduction collar 152. A source of high pressure air is introduced into the injection pipe 156, at 48a.

In operation, the arrangement described above produces a flow of high pressure air through tube 140 within the reject return pipe 130, which in turn is within the collection conduit 46. The diffuser 142 restricts the air flow so as to maintain high pressure within tube 140. Dirty water from line 116 is drawn into the annular space 144, whereupon the air diffuser 142 "sucks" the water from the annulus 144 as it discharges through the end 132 of pipe 130. This mixture of injected air and reject water fluidizes the dirty media exiting the vessel at 18. It also aids in the modest rise in elevation that the dirty media must experience to reach the air lift 148, which is above the collection conduit 46. The reduction in diameter at collar 152 relative to the diameter of the conduits 46, 112, dramatically increases the velocity of the mixture. This also performs the primary separation of the dirt from the dirty media, by air scouring.

As also shown in FIG. 3, a diaphragm air pump 160 may be provided in line 72, to control the amount of reject return flow through lines 74 and 78. This pump 160 can be powered by delivery of compressed air from source 162 via line 164. The discharge air flow from the pump 160 can then be directed via line 166 to the air lift at 48a and the air injector at 48b. Since the reject flow from 64 is relatively small and the diaphragm pump 160 pulses, air would likely be pulled into line 72 with the reject return. This pulled-in air will then be released into the sand lift system at 132, further aiding in the movement and flow of dirty media. In this mode of operation, valve 122 would normally be closed.

I claim:

1. A regenerative deep bed water filter unit including an upright vessel, an upper region in the vessel containing filtrate, an intermediate region containing particulate filter media for removing suspended solids from upflowing influent, a lower region containing dirty filter media, means for introducing influent between the intermediate and lower regions, regeneration means for withdrawing dirty media from the lower region and transporting, washing, and reintroducing the withdrawn media into the intermediate region, means for drawing wash reject out of the regeneration means, and means for drawing filtrate from the upper region out of the vessel, wherein the improvement comprises:

means for introducing a portion of the wash reject flow into the dirty filter media to produce a mixture of wash reject with the dirty filter media that is transported and washed by said regeneration means;

the regeneration means include wash means situated in the upper region, for receiving a flow of dirty media, removing the suspended solids from the flow of dirty media, and depositing cleaned media into the intermediate region, said wash means includes a compartment that is generally isolated from the filtrate in the upper region except for a compartment inlet below the filtrate level in the vessel;

said compartment includes an outlet from the vessel at an elevation above the compartment inlet but not above the filtrate level of the vessel and means defining a wash path between said compartment inlet and outlet, for flowing a portion of the filtrate from the compartment inlet to the outlet while the transported dirty media moves through the compartment toward said compartment inlet, whereby the suspended solids are carried by said filtrate portion along the wash path and out of the vessel as a flow of wash reject; and the wash means further includes a substantially tubular distribution member having closed upper and open lower ends and supported coaxially in the vessel such that the lower end is in contact with the particulate media in the intermediate region and the upper end extends upwardly to at least the compartment inlet such that the compartment inlet is situated to deposit recycled, cleaned media into the distribution member.

2. The filter unit of claim 1, wherein the filter media is sand.

3. The filter unit of claim 1, wherein the compartment has, an upper portion that
      extends generally radially,
      vertically spans the vessel filtrate level and the compartment outlet, and
      is situated to receive transported dirty media and to supply reject flow to said compartment outlet, and a lower portion formed by baffled wall means adjacent the vessel axis, for defining a wash path in which dirty media cascades downwardly in alternating directions against the wall means.

4. The filter unit of claim 1, wherein the means for introducing influent includes an influent flow conduit coaxially situated in the vessel and spanning the upper and intermediate regions so as to pass centrally through the distribution member and define an annular space therebetween, said compartment inlet being situated in said annular space.

5. The filter unit of claim 4, wherein the compartment has an upper portion that
      extends generally radially,
      vertically spans the vessel filtrate level and the compartment outlet, and
      is situated to receive transported dirty media and to supply reject flow to said compartment outlet, and a lower portion formed by baffled wall means adjacent the vessel axis, for defining a wash path in which dirty media cascades downwardly in alternating directions against the wall means.

6. A regenerative deep bed water filter unit including an upright vessel, an upper region in the vessel containing filtrate, an intermediate region containing particulate filter media for removing suspended solids from upflowing influent, a lower region containing dirty filter media, means for introducing influent between the intermediate and lower regions, regeneration means for withdrawing dirty media from the lower region and transporting, washing, and reintroducing the withdrawn media into the intermediate region, means for drawing wash reject out of the regeneration means, and means for drawing filtrate from the upper region out of the vessel, wherein the improvement comprises:

means for introducing a portion of the wash reject flow into the dirty filter media to produce a mixture of wash reject with the dirty filter media that is transported and washed by said regeneration means;

the regeneration means includes a collection conduit below the vessel and having a media inlet opening for withdrawing dirty media from the lower region of the vessel, an outlet opening for directing the withdrawn dirty media away from the inlet opening, air lift means for receiving dirty media from the collection conduit and transporting the dirty media vertically upward by air pressure, and wash means in the vessel for receiving flow of dirty media from the air lift means, removing the suspended solids from the flow of dirty media and depositing cleaned media into the intermediate region, and the means for introducing said portion of the wash reject flow introduces said portion into the collection conduit such that said air lift means receives and transports said mixture of wash reject and dirty filter media.

7. The filter unit of claim 6, wherein the collection conduit has an inner surface, a longitudinal axis, and said outlet opening is centered on the longitudinal axis, and the means for introducing a portion of wash reject water includes a first pipe having a discharge end situated within and spaced from the inner surface of the collection conduit and from which said portion of wash reject is discharged between said collection conduit inlet and outlet, and means for injecting air within the first pipe such that said portion of wash reject is discharged from the first pipe as a high velocity fluid which induces dirty media to be withdrawn from the vessel bottom into the collection conduit and directed through the conduit toward the air lift means.

8. The filter unit of claim 7, wherein the means for injecting air includes a second pipe coaxially situated within the first pipe to discharge air within and against the discharge end of the first pipe to produce a mixture of wash reject and air that fluidizes and mixes with the dirty media that has been withdrawn into the collection conduit through the inlet.

9. The filter unit of claim 8, including means for selectively introducing water under pressure to flow in the axial direction between the first and second pipes and mix with said mixture of wash reject and air within and adjacent to the discharge end of the first pipe.

10. The filter unit of claim 8, wherein the collection conduit axis is substantially horizontal, below the vessel bottom, and the air lift means includes air injection means having a vertical longitudinal axis and including a housing with an inlet for receiving said mixture of dirty media and wash reject, an outlet nozzle, an air tube coaxially situated within the housing for discharging high pressure air between the inlet and the outlet nozzle, and a transition conduit having substantially the same inner diameter as the collection conduit and connected at one end to the collection conduit and connected at the other end at an elevation above the collection conduit to the air injection means.

11. A deep bed upflow filter for removing suspended solids from an influent stream to provide a clean filtrate, comprising:

an upright vessel having a vertical axis, top and bottom ends, and contiguous upper, lower, and intermediate regions between said ends, wherein, the upper region contains filtrate up to a first elevation and means for drawing the filtrate out of the vessel, the intermediate region contains particulate filter media for removing the suspended solids from influent moving upwardly through the media as the media, dirtied with said solids, moves downwardly into the lower region, the lower region is generally tapered inwardly toward the vessel bottom and contains dirty media that has moved downwardly from the intermediate region;

means for introducing influent between the intermediate and lower regions with sufficient pressure to cause said upward flow of influent through the intermediate region;

means for collecting dirty media out of the lower region at the bottom of the vessel and transporting the media to the top of the vessel;

wash means situated in the upper region, for receiving a flow of dirty media from the means for drawing, removing the solids from the flow of dirty media, and depositing cleaned media into the intermediate region, said wash means including a compartment that is generally isolated from the filtrate in the upper region except for a compartment inlet at a second elevation below said first elevation, said compartment further including an outlet from the vessel at a third elevation above the second elevation but not above said first elevation, and means defining a wash path between said compartment inlet and outlet, for flowing some of the filtrate from the compartment inlet to the outlet while the conveyed dirty media moves through the compartment toward said compartment inlet, whereby solids are carried by the filtrate along the wash path and out of the vessel as a flow of reject;

first pipe means fluidly connected to the reject flow, for delivering a first portion of the reject flow to the dirty media in the lower region; and second pipe means fluidly connected to the reject flow, for delivering a second portion of the reject flow to the means for collecting and transporting dirty media out of the lower region.

12. The filter of claim 11, wherein the means for collecting and transporting the dirty media include, a first conduit for receiving the dirty media directly from the lower region, a second conduit fluidly connected to the first conduit, and extending-vertically along the vessel exterior to a discharge end above the wash means compartment, and fluidization means situated between the first and second conduits, for inducing a fluidized flow of the dirty media upwardly through the second conduit.

13. The filter of claim 12, including flow means for selectively introducing high pressure water to said first conduit at a location upstream of the location where the dirty media is received by the first conduit.

14. The filter of claim 13, wherein the fluidization means includes means for injecting air into the second conduit.

15. The filter of claim 11, wherein the wash means includes a substantially tubular distribution member having upper and lower ends and supported coaxially in the vessel such that the lower end is in contact with the particulate media in the intermediate region and the upper end extends upwardly to at least said second elevation, where the compartment inlet is situated to deposit recycled, cleaned media into the distribution member.

16. The filter of claim 15, wherein the compartment has
   an upper portion that
      extends generally radially,
      vertically spans said first and third elevations, and
      is situated to receive dirty media from the means for transporting dirty media and to supply reject flow to said compartment outlet, and
   a lower portion formed by baffled wall means adjacent the vessel axis, for defining said wash path, such that dirty media cascades downwardly in alternating directions against the wall means.

17. The filter of claim 15, wherein
   the means for introducing influent includes an influent flow conduit coaxially situated in the vessel and spanning the upper and intermediate regions so as to pass centrally through the distribution member and define an annular space therebetween, said compartment inlet being situated in said annular space.

18. The filter of claim 17, wherein the compartment has
   an upper portion that
      extends generally radially,
      vertically spans said first and third elevations, and
      is situated to receive dirty media from the means for transporting dirty media and to supply reject flow to said compartment outlet, and
   a lower portion formed by baffled wall means adjacent the vessel axis, for defining said wash path, such that dirty media cascades downwardly in alternating directions against the wall means.

19. The filter of claim 18, wherein the annular space in distribution member contains a ring of cleaned filter media bearing upon and free to move downwardly into the media in the intermediate region, and a ring of filtrate on the ring of media, said filtrate ring being at a hydraulic pressure determined by the filtrate level at said first elevation.

20. The filter of claim 11, wherein the first pipe means discharges in the lower region substantially at the lower end of the vessel.

21. The filter of claim 20, including flow means for selectively introducing high pressure water to said first conduit at a location upstream of the location where the dirty media is received by the first conduit.

22. The filter of claim 21, wherein the second pipe means delivers the second portion of the reject flow to a location upstream of the location where the dirty media is received by the first conduit.

23. An improved method for operating an upflow, regenerative deep bed filter unit in which a liquid influent is introduced between a region of relatively clean particulate filter media and a region of relatively dirty particulate filter media and induced to flow upward through the relatively clean media to accumulate in a filtrate region above the relatively clean media while the relatively clean media moves downwardly into the region of relatively dirty media and is regeneratively washed before being deposited in the region of relatively clean media, the washing resulting in a reject flow to be discharged from the unit, wherein the improvement comprises mixing a portion of the reject flow with high pressure air and then introducing the mixture into the relatively dirty media before the dirty media is regeneratively washed.

24. The method of claim 23, wherein the dirty media, high pressure air, and said portion of reject flow are mixed in a collection conduit below the region of relatively dirty media.

25. The method of claim 24, wherein
   the high pressure air and said portion of reject flow are introduced into the collection conduit through concentric pipes, and
   said air and said portion of reject flow are discharged from the concentric pipes at high velocity so as to draw dirty media and reject flow into the collection conduit, and direct the mixture of dirty media, reject flow, and air toward air lift means connected to the collection conduit for transporting the mixture to be regeneratively washed.

* * * * *